UNITED STATES PATENT OFFICE.

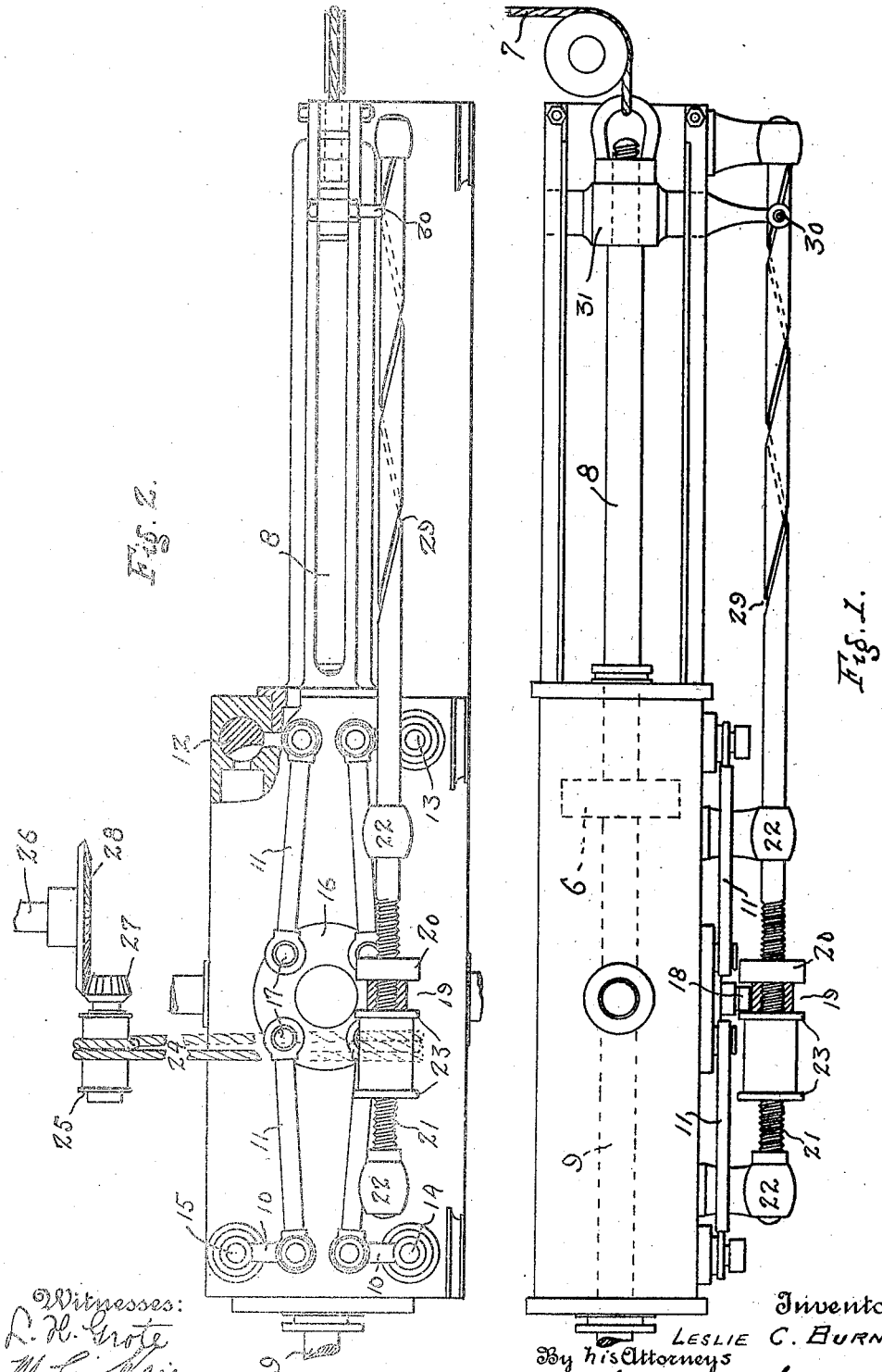

LESLIE CAULDWELL BURNS, OF UNION HILL, NEW JERSEY.

MARINE STEERING-GEAR.

1,103,738.  Specification of Letters Patent.  Patented July 14, 1914.

Application filed March 11, 1914. Serial No. 823,919.

*To all whom it may concern:*

Be it known that I, LESLIE CAULDWELL BURNS, a citizen of the United States of America, and residing at Union Hill, in the county of Hudson and State of New Jersey, have invented a certain new and Improved Marine Steering-Gear, of which the following is a specification.

My invention relates to marine steering gear and particularly to power operated gear, the object of my invention being to improve the apparatus shown in my prior Patent 1,073,954 in the features hereinafter described and pointed out in the claims.

In the accompanying drawing, Figure 1 is a plan view of a steering apparatus in which my invention is embodied in one form; and Fig. 2 is a side elevation of the same.

In the apparatus shown in my prior patent above mentioned, the valves 12, 13, 14 and 15 are controlled from a disk geared directly to the hand wheel. It is consequently necessary to turn the hand wheel at the upper end of spindle 26 or to release it thereby permitting the return spring to act in order to reëstablish the normal valve position. While this arrangement is satisfactory under many conditions, I have found that for harbor tugs, which are constantly changing course, the present arrangement is preferable.

As before, the apparatus comprises the steam cylinder 5, with piston 6 having rods 8 and 9 passing out through stuffing boxes in opposite ends of the cylinder and attached to the tiller harness 7. The valves are provided with operating levers 10 and links 11 substantially corresponding to those previously used. Instead of the bevel gear wheel of my prior construction however, I now pivot the links 11 to studs 17 on the oscillating disk 16 carried by the cylinder frame. To oscillate the disk and thereby actuate the valves, I provide it with a pin 18 engaged in an annular groove 19 in a sleeve 20 threaded on the screw 21 journaled in brackets 22 on the cylinder frame. Collars 23 on the sleeve form a runway for the belt 24 which passes therefrom to the pulley 25 on the spindle of the bevel pinion 27. The latter meshes with the bevel gear 28 on the wheel spindle 26. Obviously upon the rotation of the spindle 26 by the hand wheel (not shown) the belt 24 rotates the sleeve 20 thus causing the latter to travel longitudinally on the screw 21 and consequently oscillating the disk 16 and thus operating the valves which control the steam admission to and exhaust from the cylinder.

The automatic return of the valves to normal position is obtained through the travel of the piston rod. To this end the screw 21 is extended parallel to the piston rod to one side of the cylinder and a spiral groove 29 of any suitable predetermined pitch cut therein. A pin 30 carried by the cross head 31 of the piston rod 8, is engaged in said spiral groove 29. Consequently on the longitudinal displacement of the piston in one direction or the other, the travel of the pin 30 in the groove 29 causes the screw 21 to rotate. If the helmsman has stopped rotating the hand wheel, the sleeve is held against rotation by the friction of the belt, but travels longitudinally on the screw by reason of the rotation of the latter. This longitudinal movement of the sleeve returns the valves to normal position, and the rudder is thus relieved from duty.

It will be readily observed that through the present arrangement the helmsman has only to operate the hand wheel in the direction he wishes to go, leaving the automatic return of the rudder to be accomplished through the shifting of the valve-operating sleeve 20 by the rotation of the screw 21 during the travel of the piston rod. If it is desired to throw the rudder full over to one side, it is only necessary that the helmsman keep rotating his wheel at a speed sufficient to prevent the return travel of the sleeve under the influence of the reverse rotation of the screw on the travel of the piston rod. He thereby maintains the valve open and permits the steam to force the piston through its full stroke. This is readily accomplished by making the bevel gear 28 of greater diameter than the pinion 27 or through any other suitable multiplying arrangement. To return the rudder to mid-position it is now necessary to rotate the hand wheel in the opposite direction to restore the valves to normal position, and also to continue the rotation of the wheel in this direction during the travel of the piston back to mid-position, since otherwise the reverse rotation of the screw under the influence of the pin 30 would displace the valves again. The pitch of the spiral groove 29 may be predetermined as desired, as likewise the particular gear ratio, between the bevel gears 27, 28, while various changes in the details of construction will readily suggest themselves.

I claim as my invention:—

1. In a motor of the character described, a pressure cylinder, a piston working therein, a piston rod extending beyond the end of the cylinder, valves controlling the admission of pressure to opposite faces of the piston, a screw rod, a sleeve threaded thereon, means operated on the longitudinal movement of said sleeve on the screw rod to actuate said valves and means operated by the travel of the piston in the cylinder to rotate said rod and thus longitudinally displace the said sleeve.

2. In a motor of the character described, a pressure cylinder, a piston working therein, a piston rod extending beyond the end of the cylinder, valves for admitting fluid pressure to opposite faces of the piston, a screw rod, a sleeve threaded thereon, means controlled by said sleeve for operating said valves on the longitudinal displacement of the sleeve on said screw rod, manually operated means for rotating said sleeve on said rod to effect longitudinal displacement of the sleeve, and means operated by the travel of the piston for rotating said screw rod in a direction to effect longitudinal displacement of the sleeve in a direction opposite to that in which it has been traveled by the manually operated means.

3. In a motor of the character described, a pressure cylinder, a piston working therein, a piston rod extending beyond the end of the cylinder, valves for admitting fluid pressure to opposite faces of the piston, a screw rod, a sleeve threaded thereon, means controlled by said sleeve for operating said valves on the longitudinal displacement of the sleeve on said screw rod, manually operated means for rotating said sleeve on said rod to effect longitudinal displacement of the sleeve, and means operated by the travel of the piston for rotating said screw rod in a direction to effect longitudinal displacement of the sleeve in a direction opposite to that in which it has been traveled by the manually operated means, said manually controlled and piston controlled means being capable of simultaneous operation.

4. In a motor of the character described, a pressure cylinder, a piston working therein, a piston rod extending beyond the end of the cylinder, valves for admitting fluid pressure to opposite faces of the piston, a screw rod parallel to the piston a sleeve threaded thereon and operatively connected to the valves to actuate the latter, a manually operated belt for rotating said sleeve on the screw rod, an extension of the screw rod having a spiral groove cut therein, and a pin on the piston rod engaged in said groove to effect the rotation of said screw rod on the travel of the piston, substantially as described.

5. In a motor of the character described, a pressure cylinder, a piston working therein, a piston rod extending beyond the end of the cylinder, valves for admitting fluid pressure to the opposite faces of the piston, a rotatable screw rod arranged parallel to the piston, a sleeve threaded on said rod and operatively connected to the valves to actuate the latter, manually operated means for rotating said sleeve on the screw rod, an extension of the latter having a high pitch spiral groove therein and a pin on the piston rod engaging said groove to effect the rotation of said screw rod on the travel of the piston, substantially as described.

In testimony whereof I have signed my name to this specification in the presence of two subscribing witnesses.

LESLIE CAULDWELL BURNS.

Witnesses:
WALTER ABBE,
L. H. GROTE.

---

"Copies of this patent may be obtained for five cents each, by addressing the "Commissioner of Patents, Washington, D. C."